(12) United States Patent
Baier et al.

(10) Patent No.: US 7,930,639 B2
(45) Date of Patent: Apr. 19, 2011

(54) CONTEXTUALIZATION FOR HISTORIANS IN INDUSTRIAL SYSTEMS

(75) Inventors: John J. Baier, Mentor, OH (US); Taryl J. Jasper, South Euclid, OH (US); John T. Campbell, Bridgeville, PA (US); Robert J. McGreevy, Oswego, IL (US); Frank Anthony Palmieri, Jr., Gibsonia, PA (US); Robert J. Herbst, Aurora, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 769 days.

(21) Appl. No.: 11/862,183

(22) Filed: Sep. 26, 2007

(65) Prior Publication Data

US 2009/0083649 A1 Mar. 26, 2009

(51) Int. Cl.
*G06F 13/00* (2006.01)
*G06F 15/00* (2006.01)

(52) U.S. Cl. ........................................ 715/763; 715/765

(58) Field of Classification Search .................. 715/700, 715/748, 762–765, 740–743, 851–853; 709/223–224; 706/11, 37
See application file for complete search history.

(56) References Cited

U.S. PATENT DOCUMENTS

| | | | |
|---|---|---|---|
| 4,510,565 A | 4/1985 | Dummermuth | |
| 4,553,205 A | 11/1985 | Porchia | |
| 4,616,333 A | 10/1986 | Shimoni | |
| 4,718,025 A | 1/1988 | Minor et al. | |
| 4,731,735 A | 3/1988 | Borgendale et al. | |
| 4,773,028 A | 9/1988 | Tallman | |
| 4,831,529 A | 5/1989 | Miike et al. | |
| 4,975,865 A | 12/1990 | Carrette et al. | |
| 5,003,469 A | 3/1991 | Kamiyama et al. | |
| 5,051,932 A | 9/1991 | Inoue et al. | |
| 5,274,781 A | 12/1993 | Gibart | |
| 5,452,201 A | 9/1995 | Pieronek et al. | |
| 5,568,383 A | 10/1996 | Johnson et al. | |
| 5,805,442 A | 9/1998 | Crater et al. | |
| 5,901,323 A | 5/1999 | Milliken et al. | |
| 5,943,675 A | 8/1999 | Keith et al. | |
| 5,991,793 A | 11/1999 | Mukaida et al. | |
| 6,092,036 A | 7/2000 | Hamann | |

(Continued)

FOREIGN PATENT DOCUMENTS

EP 0490864 6/1992

(Continued)

OTHER PUBLICATIONS

"Major Canadian Natural Gas Producer Buys AnyWhere/AnyTime Services from Industrial Evolution" Mar. 12, 2001, Industrial Evolution pp. 1.

(Continued)

*Primary Examiner* — Cao (Kevin) Nguyen
(74) *Attorney, Agent, or Firm* — Turocy & Watson LLP; William R. Walbrun; John M. Miller

(57) ABSTRACT

Systems and methods that discover relations and correlates among disparate pieces of data, to infer possible relationships between the industrial process and historian data/events to improve industrial operations. A correlation component can employ heuristic models to capture process data/event data, and can further include an implicit correlation component and an explicit correlation component. Accordingly, relations among various parameters can be discovered (e.g., dynamically) and proper corrective adjustments supplied to the industrial process.

18 Claims, 12 Drawing Sheets

U.S. PATENT DOCUMENTS

| | | | |
|---|---|---|---|
| 6,110,214 | A | 8/2000 | Klimasauskas |
| 6,139,201 | A | 10/2000 | Carbonell et al. |
| 6,198,480 | B1 | 3/2001 | Cotugno et al. |
| 6,204,782 | B1 | 3/2001 | Gonzalez et al. |
| 6,219,649 | B1 | 4/2001 | Jameson |
| 6,233,623 | B1 | 5/2001 | Jeffords et al. |
| 6,252,589 | B1 | 6/2001 | Rettig et al. |
| 6,263,487 | B1 | 7/2001 | Stripf et al. |
| 6,298,393 | B1 | 10/2001 | Hopsecger |
| 6,298,454 | B1 | 10/2001 | Schleiss et al. |
| 6,385,496 | B1 | 5/2002 | Irwin et al. |
| 6,411,987 | B1 | 6/2002 | Steger et al. |
| 6,505,247 | B1 | 1/2003 | Steger et al. |
| 6,536,029 | B1 | 3/2003 | Boggs et al. |
| 6,539,271 | B2 | 3/2003 | Lech et al. |
| 6,559,861 | B1 | 5/2003 | Kennelly et al. |
| 6,574,639 | B2 | 6/2003 | Carey et al. |
| 6,584,488 | B1 | 6/2003 | Brenner et al. |
| 6,618,856 | B2 | 9/2003 | Coburn et al. |
| 6,633,782 | B1 | 10/2003 | Schleiss et al. |
| 6,701,324 | B1 | 3/2004 | Nair et al. |
| 6,754,668 | B2 | 6/2004 | Noble et al. |
| 6,754,885 | B1 | 6/2004 | Dardinski et al. |
| 6,766,214 | B1 | 7/2004 | Wang et al. |
| 6,795,798 | B2 | 9/2004 | Eryurek et al. |
| 6,799,148 | B2 | 9/2004 | Ling et al. |
| 6,847,850 | B2 | 1/2005 | Grumelart |
| 6,847,854 | B2 | 1/2005 | Discenzo |
| 6,865,644 | B2 | 3/2005 | Husted et al. |
| 6,952,727 | B1 | 10/2005 | Lindner et al. |
| 6,975,913 | B2 | 12/2005 | Kreidler et al. |
| 7,043,311 | B2 | 5/2006 | Nixon et al. |
| 7,050,873 | B1 | 5/2006 | Discenzo |
| 7,069,201 | B1 | 6/2006 | Lindner et al. |
| 7,152,222 | B2 | 12/2006 | Kumhyr et al. |
| 7,181,370 | B2 | 2/2007 | Furem et al. |
| 7,206,646 | B2 | 4/2007 | Nixon et al. |
| 7,206,965 | B2 | 4/2007 | Roddy et al. |
| 7,218,974 | B2 | 5/2007 | Rumi et al. |
| 7,228,310 | B2 | 6/2007 | O'Brien |
| 7,249,356 | B1 | 7/2007 | Wilson et al. |
| 7,272,665 | B2 | 9/2007 | Yamada et al. |
| 7,275,062 | B2 | 9/2007 | Deitz et al. |
| 7,286,888 | B2 | 10/2007 | Monette et al. |
| 7,299,367 | B2 | 11/2007 | Hamm et al. |
| 7,328,078 | B2 | 2/2008 | Sanford et al. |
| 7,359,930 | B2 | 4/2008 | Jackson et al. |
| 7,406,453 | B2 | 7/2008 | Mundie et al. |
| 7,574,417 | B1 | 8/2009 | McGreevy et al. |
| 7,584,216 | B2 | 9/2009 | Travieso et al. |
| 7,616,095 | B2 | 11/2009 | Jones et al. |
| 7,627,385 | B2 | 12/2009 | McGreevy et al. |
| 7,684,876 | B2 | 3/2010 | Grgic |
| 7,693,585 | B2 | 4/2010 | Kalan et al. |
| 7,742,833 | B1 | 6/2010 | Herbst et al. |
| 2002/0019839 | A1 | 2/2002 | Shiu |
| 2002/0069235 | A1 | 6/2002 | Chen |
| 2002/0120744 | A1 | 8/2002 | Chellis et al. |
| 2002/0133523 | A1 | 9/2002 | Ambler et al. |
| 2002/0169907 | A1 | 11/2002 | Candea et al. |
| 2002/0174263 | A1 | 11/2002 | Codd et al. |
| 2002/0184601 | A1 | 12/2002 | Fitzhenry et al. |
| 2002/0184610 | A1 | 12/2002 | Chong et al. |
| 2003/0014130 | A1* | 1/2003 | Grumelart ............... 700/28 |
| 2003/0041135 | A1* | 2/2003 | Keyes et al. ............. 709/223 |
| 2003/0100958 | A1 | 5/2003 | Cachat et al. |
| 2003/0101208 | A1 | 5/2003 | Chauvel et al. |
| 2003/0130899 | A1 | 7/2003 | Ferguson et al. |
| 2003/0172107 | A1 | 9/2003 | Leyfer et al. |
| 2003/0182303 | A1 | 9/2003 | Gibson |
| 2004/0153437 | A1 | 8/2004 | Buchan |
| 2004/0181294 | A1 | 9/2004 | Deitz et al. |
| 2004/0225649 | A1 | 11/2004 | Yeo et al. |
| 2005/0071755 | A1 | 3/2005 | Harrington et al. |
| 2005/0085928 | A1 | 4/2005 | Shani |
| 2005/0198034 | A1 | 9/2005 | Boyer |
| 2005/0198406 | A1 | 9/2005 | Sichner |
| 2005/0203648 | A1 | 9/2005 | Martin |
| 2005/0210337 | A1 | 9/2005 | Chester et al. |
| 2006/0004827 | A1 | 1/2006 | Stuart |
| 2006/0020928 | A1 | 1/2006 | Holloway et al. |
| 2006/0026559 | A1 | 2/2006 | Gunturi et al. |
| 2006/0067334 | A1 | 3/2006 | Ougarov et al. |
| 2006/0161268 | A1 | 7/2006 | Frensch et al. |
| 2006/0259160 | A1 | 11/2006 | Hood et al. |
| 2006/0291283 | A1 | 12/2006 | Jin et al. |
| 2006/0294502 | A1 | 12/2006 | Das et al. |
| 2007/0006039 | A1 | 1/2007 | Fichter et al. |
| 2007/0027913 | A1 | 2/2007 | Jensen et al. |
| 2007/0028070 | A1 | 2/2007 | Avergun et al. |
| 2007/0038610 | A1 | 2/2007 | Omoigui |
| 2007/0050348 | A1 | 3/2007 | Aharoni et al. |
| 2007/0073744 | A1 | 3/2007 | McVeigh et al. |
| 2007/0112447 | A1 | 5/2007 | McGreevy et al. |
| 2007/0112801 | A1 | 5/2007 | McGreevy et al. |
| 2007/0136533 | A1 | 6/2007 | Church et al. |
| 2007/0142941 | A1 | 6/2007 | McGreevy et al. |
| 2007/0156770 | A1 | 7/2007 | Espelien |
| 2007/0244964 | A1 | 10/2007 | Challenger et al. |
| 2007/0282577 | A1 | 12/2007 | Lind |
| 2007/0288795 | A1 | 12/2007 | Leung et al. |
| 2007/0294078 | A1 | 12/2007 | Kim et al. |
| 2008/0027678 | A1 | 1/2008 | Miller |
| 2008/0082577 | A1 | 4/2008 | Hood et al. |
| 2008/0126408 | A1 | 5/2008 | Middleton |
| 2008/0313228 | A1 | 12/2008 | Clark et al. |

FOREIGN PATENT DOCUMENTS

| | | |
|---|---|---|
| EP | 1109107 | 6/2001 |
| EP | 1307823 | 5/2003 |
| GB | 2347234 | 8/2000 |
| GB | 2353616 A1 | 2/2001 |
| WO | 2004027531 A1 | 4/2004 |
| WO | 2005006130 A2 | 1/2005 |
| WO | 2005006130 A3 | 1/2005 |

OTHER PUBLICATIONS

Real Time Intelligence at the Source-Deploying and EMbedded Historian. Users Conference 2005, pp. 1.

Miller, et al. "Extending the Reach of Enterprise Data Management in a World of M2M." ISA EXPO. Oct. 2005, pp. 1-7.

"Proficy Historian"; Dec. 16, 2004, GE FANUC, pp. 1-8.

European Search Report dated Feb. 22, 2008 for European Patent Application Serial No. EP 07 11 7388, 1 Page.

European Search Report dated Jan. 20, 2009 for European Patent Application No. EP08156281, 6 Pages.

EP Office Action for Application No. 08165215.8-1243 dated Mar. 3, 2009, 2 pages.

European Search Report and Written Opinion for European Application No. EP 08 16 5215, dated Dec. 8, 2008, 6 pages.

Sakharov. Macro-Processing in High-Level Languages. ACM SIGPLAN Notices, vol. 27, No. 11, Nov. 1, 1992, pp. 59-66, XP000328425, ISSN: 0362-1340. Last accessed Jan. 20, 2009, 18 pages.

Cardoso, et al. Macro-Based Hardware Compilation of Java (TM) Bytecodes Into a Dynamic Reconfigurable Computing System, Apr. 21, 1999. In IEEE Seventh Symposium on Field Programmable Custom Computing Machines, (FCCM'99). Napa Valley, California, Apr. 21-23, 1999. http://citeseerx.ist.psu.edu/viewdoc/summary?doi=10.1.1.41.8292. Last accessed Jan. 21, 2008, 10 pages.

European Search Report dated Feb. 5, 2008 for European Patent Application No. EP07117614, 8 pgs.

Alvestrand. "Tags for the Identification of Languages: rfc 1766. txt," Internet Engineering Task Force, Mar. 1995, XP015007553, Issn: 0000-0003. ftp://ftp.isi.edu/in-notes/rfc1766.txt. Last accessed Jun. 6, 2008, 9 pages.

European Search Report dated May 2, 2008 for European Patent Application No. EP07117622, 3 pgs.

Power RICH System, Enterprise Edition, Historian (PRS EE Historian) Version 1.5, last accessed Dec. 3, 2008, 15 pages.

Wonderware Plant Intelligence Solution Helps Arla Foods Deliver Fresh Milk Products to the Tables of Europe. Last accessed Dec. 3, 2008, 4 pages.

European Search Report dated Dec. 18, 2007 for European Patent Application Serial No. 07117364.5-2221, 2 pages.
OA dated Dec. 18, 2008 for U.S. Appl. No. 11/536,522, 15 pages.
OA dated Apr. 3, 2009 for U.S. Appl. No. 11/536,522, 20 pages.
OA dated Jul. 21, 2008 for U.S. Appl. No. 11/536,522, 21 pages.
OA dated Oct. 13, 2009 for U.S. Appl. No. 11/536,522, 22 pages.
OA dated Sep. 16, 2009 for U.S. Appl. No. 11/558,705, 23 pages.
OA dated Apr. 22, 2009 for U.S. Appl. No. 11/558,705, 23 pages.
OA dated Jul. 29, 2009 for U.S. Appl. No. 11/558,710, 18 pages.
OA dated Nov. 14, 2008 for U.S. Appl. No. 11/558,710, 18 pages.
OA dated Jul. 28, 2008 for U.S. Appl. No. 11/536,545, 26 pages.
OA dated Dec. 12, 2008 for U.S. Appl. No. 11/536,545, 18 pages.
OA dated Jul. 10, 2009 for U.S. Appl. No. 11/536,545, 30 pages.
OA dated Jan. 26, 2009 for U.S. Appl. No. 11/536,535, 40 pages.
OA dated Jul. 23, 2008 for U.S. Appl. No. 11/536,535, 31 pages.
OA dated Dec. 3, 2008 for U.S. Appl. No. 11/536,566, 35 pages.
OA dated Jan. 4, 2010 for U.S. Appl. No. 11/558,710, 37 pages.
CNOA Due Dec. 29, 2008 for Chinese Patent Application No. 200710162327.9, 6 pages.
OA dated Mar. 30, 2010 for U.S. Appl. No. 11/558,705, 44 pages.
European Search Report dated Mar. 25, 2010 for European Patent Application No. EP 07 12 0362, 6 pages.
"High Level Triggers, Data Acquisition and Controls." ATLAS Technical Design Report, Jun. 30, 2003, pp. 1-370, XP002570453, Chapters 1-7, 9, 11, 13. http://cdsweb.cern.ch/record/616089/files/cer-002375189.pdf. Last accessed Apr. 1, 2010, 196 pages.
Vermeulen, et al. "ATLAS Dataflow: the Read-Out Subsystem, Results from Trigger and Data Acquisition System Testbed Studies and from Modeling." 14th IEEE—NPSS Real time Conference, Stockholm, Sweden, Jun. 4-10, 2005, pp. 270-274, XP010859081, ISBN: 978-0-7803-9183-3.
Gameiro, et al. "The ROD Crate DAQ of the ATLAS Data Acquisition System." 14th IEEE—NPSS Real time Conference, Stockholm, Sweden, Jun. 4-10, 2005, pp. 527-531, XP010859117, ISBN: 978-0-7803-9183-3.
European Search Report dated Mar. 25, 2010 for European Patent Application No. EP 07 12 0357, 5 pages.
OA dated Mar. 24, 2010 for U.S. Appl. No. 11/750,193, 36 pages.
European Search Report dated Mar. 10, 2010 for European Application Serial No. EP 08 16 4957, 7 pages.
Charbonnier, et al. "Trends Extraction and Analysis for Complex System Monitoring and Decision Support." Feb. 1, 2005, Engineering Applications of Artificial Intelligence, Pineridge Press, Swansea, GB, pp. 21-36, XP025299588, ISSN: 0952-1976.

Uraikul, et al. "Artificial Intelligence for Monitoring and Supervisory Control of Process Systems." Nov. 30, 2006, Engineering Applications of Artificial Intelligence, Pineridge Press, Swansea, GB, pp. 115-131, XP005786108, ISSN: 0957-1976.
OA dated Apr. 1, 2010 for U.S. Appl. No. 11/863,216, 28 pages.
OA dated Jun. 25, 2010 for U.S. Appl. No. 11/862,182, 41 pages.
OA dated May 27, 2010 for U.S. Appl. No. 11/537,110, 77 pages.
OA dated Jun. 11, 2010 for U.S. Appl. No. 11/862,180, 27 pages.
A new general purpose compression method for searching in large collection, Bhadade, U.S.; Sharma, V.K.; Trivedi, A.I.; Tencon 2007—2007 IEEE Region 10 Conference Digital Object Identifier: 10.11 09ITENCON.2007.4428935. Publication Year: 2007 , pp. 1-4.
Input Data Representation for Self-Organizing Map in Software Classification, Yuqing Lin; Huilin Ye; Knowledge Acquisition and Modeling, 2009. KAM '09. Second International Symposium on vol. 2 Digital Object Identifier: 10.11 09/KAM.2009.151, Publication Year: 2009 , pp. 350-353.
Supervised and Traditional Term Weighting Methods for Automatic Text Categorization, Man Lan; Chew Lim Tan; Jian Su; Yue Lu; Pattern Analysis and Machine Intelligence, IEEE Transactions on vol. 31 , Issue: 4. Digital Object Identifier: 10.11 09/TPAMI.2008.11 0 Publication Year: 2009 , pp. 721-735.
Selecting predicate logic for knowledge representation by comparative study of knowledge representation schemes, Ali, A.; Khan, M.A.; Emerging Technologies, 2009. ICET 2009. International Conference on Digital Object Identifier: 10.11 09/ICET.2009.5353207 Publication Year: 2009 , pp. 23-28.
Notice of Allowance dated Jun. 13, 2010 for U.S. Appl. No. 11/862,891, 49 pages.
OA dated Jul. 8, 2010 for U.S. Appl. No. 11/558,710, 28 pages.
OA dated Jul. 23, 2010 for U.S. Appl. No. 11/536,550, 51 pages.
OA dated Aug. 23, 2010 for U.S. Appl. No. 11/558,705, 44 pages.
OA dated Sep. 17, 2010 for U.S. Appl. No. 11/864,634, 43 pages.
OA dated Oct. 14, 2010 for U.S. Appl. No. 11/862,861, 43 pages.
OA dated Sep. 3, 2010 for U.S. Appl. No. 11/750,193, 68 pages.
Notice of Allowance mailed Dec. 13, 2010 for U.S. Appl. No. 11/862,180, 74 pages.
OA dated Nov. 19, 2010 for U.S. Appl. No. 12/783,229, 41 pages.
Notice of Allowance mailed Nov. 9, 2010 for U.S. Appl. No. 11/537,110, 38 pages.
OA dated Jan. 4, 2011 for U.S. Appl. No. 11/536,550, 44 pages.
European Search Report dated Oct. 22, 2010 for European Patent Application No. EP 08 16 5010, 10 pages.

* cited by examiner

CONTEXTUALIZATION FOR HISTORIANS IN INDUSTRIAL SYSTEMS

TECHNICAL FIELD

The subject innovation relates generally to historians associated with industrial controllers and more particularly to historians that infer relationships between disparate events (e.g., non-time series events) and operation of the industrial process (e.g., an outcome of the process).

BACKGROUND

Industrial controllers are special-purpose computers utilized for controlling industrial processes, manufacturing equipment, and other factory automation, such as data collection or networked systems. At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. Differences in PLCs are typically dependent on the number of Input/Output (I/O) they can process, amount of memory, number and type of instructions, and speed of the PLC central processing unit (CPU).

In a more macro sense than the controller, businesses have become more complex in that higher order business systems or computers often need to exchange data with such controllers. For instance, an industrial automation enterprise may include several plants in different locations. Modern drivers such as efficiency and productivity improvement, and cost-reduction, are requiring manufacturers to collect, analyze, and optimize data and metrics from global manufacturing sites. For example, a food company can have several plants located across the globe for producing a certain brand of food. These factories in the past were standalone, with minimum data collection and comparison of metrics with other similar factories. In the networked world of today, manufacturers are demanding real-time data from their factories to drive optimization and productivity. Unfortunately, conventional control systems architectures are not equipped to allow a seamless exchange of data between these various components of the enterprise.

Another requirement of modern control system architectures is the ability to record and store data in order to maintain compliance with administrative regulations. One common solution for recording data includes providing a local recording module that often occupies a slot in a controller backplane such as a PC-Historian which is an industrial computer for the controller backplane, and employs a transitional layer to supply an indirect interface to the controller. This includes a platform that provides high speed, time series, data storage and retrieval with both local and remote control processors. The PC-Historian communicates with controllers directly through the backplane and can communicate remotely via a network interface. The PC-Historian allows archiving data from the controller to an Archive Engine which provides additional storage capabilities.

Moreover, control modules can be spatially distributed along a common communication link in several locations, wherein such controllers can then communicate with each other, and/or with historians or applications outside of a control environment (e.g., data collection systems/business related systems and applications). Accordingly, information management, such as message exchanges that employ different protocols and configurations are becoming complex. For example, the mapping of information from production management to process control and custom glue code for integrating systems with different protocols and formats can create configuration and management difficulties.

Furthermore, failed communications (e.g., messages that are not received or acted upon), delayed responses (e.g., as a function of the time difference between a sent message and a re-send), and additional overhead (e.g., consumption of processing cycles to review stored notifications, schedule re-transmissions and re-send messages) further add to the problems involved.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

The subject innovation provides for a historian(s) with a correlation component(s) that discovers relations and correlates among disparate pieces of data, to infer possible relationships between historian data/events and the industrial process (e.g., predict an outcome thereof). The correlation component can employ a heuristic model to capture process data/event data, and further include an implicit correlation component and an explicit correlation component. The explicit correlation component can employ predetermined models that are set by a user/external data sources, and the implicit correlation component can deduce relations among causes of triggering events (e.g., dynamically and/or in real-time during operation). For example, instead of merely storing values, messages that cause transition of values can be stored and compared via the implicit correlation component to derive correlations among various states that share the same messages. Accordingly, relations among various parameters can be discovered (e.g., dynamically) and proper corrective adjustments supplied to the industrial process.

In accordance to a related methodology of the subject innovation, initially a set of data related to the industrial process can be collected. Such data can then be correlated to a predetermined model and a model that best fits (e.g., statistically) can subsequently be selected. Accordingly, quality analysis can occur ahead of processing and during the control process via employing historian data at various granularity levels. Such granularity levels of data collection/implementation can depend upon factors such as: the nature of the manufacturing process; outcome of the quality control tests; criticality of operation, and the like. Moreover, based on such historian data, the quality control process of the subject innovation can predict outcome of quality for the industrial process, and initiate correction actions in view of current values of data. For example, threshold values can be set to determine and trigger various actions during execution, such as: automatically performing corrective measures and maintenance procedures; invoking embedded files within a process that can be utilized by other components or reviewed by an operator; providing Just-In-Time training to an operator during various stages of the process; spawning other automatic procedures during various stages of industrial production, and the like. By associating historians with quality procedures, timely, tighter and more stringent controls can be applied to various automation processes—thus increasing overall quality in an automated manufacturing environment.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
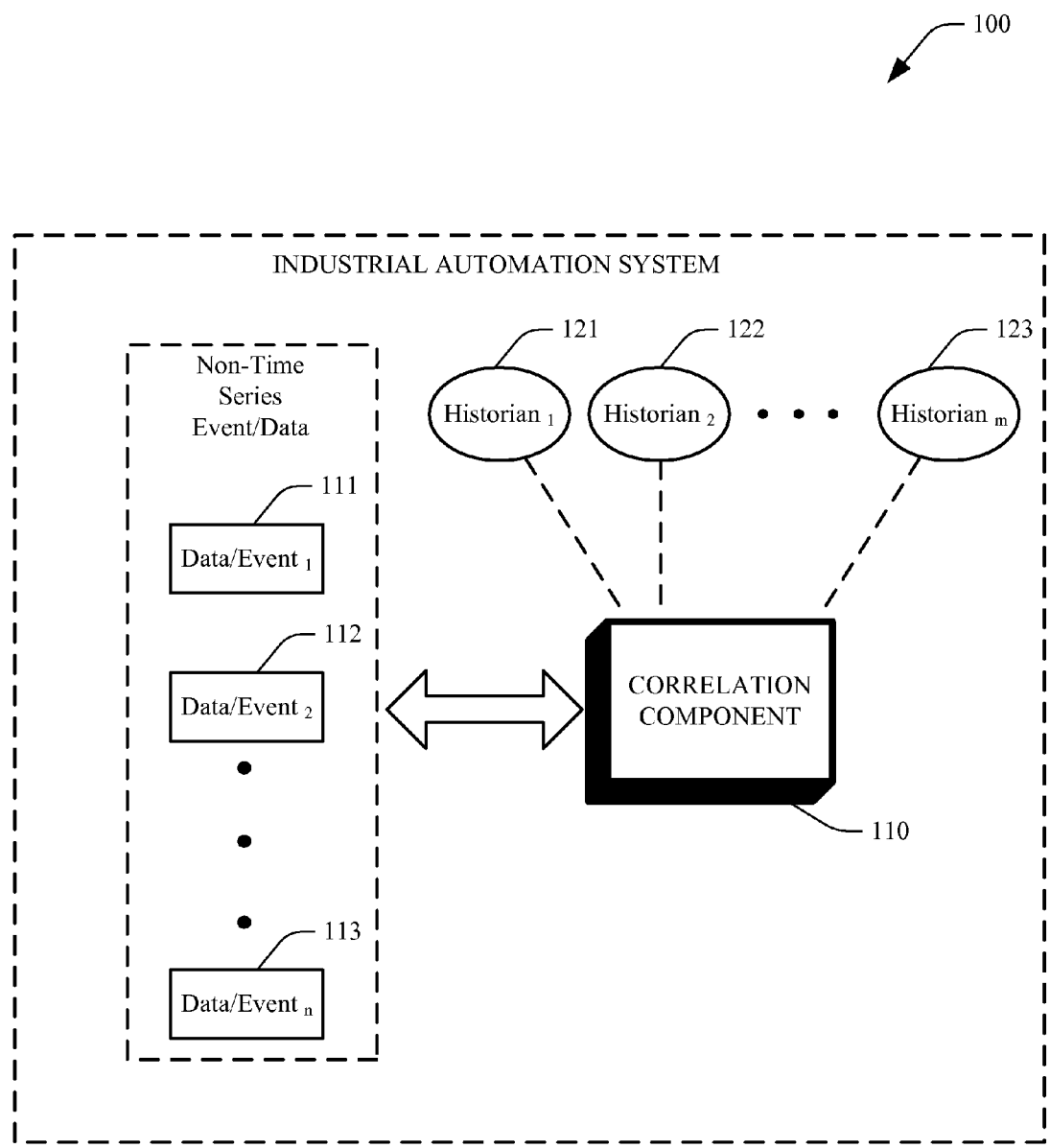
FIG. 1 is a schematic block diagram of a correlation component that correlates among disparate pieces of data in accordance with an aspect of the subject innovation.

FIG. 1 illustrates a correlation component 110 that is associated with a plant embedded historian network of an industrial programmer system 100 (e.g., a network of controller devices), which facilitates correlation among disparate pieces of data/event 111, 112, 113, to improve industrial operations. Such data/events can include historian data, activity, alarms, commands, messages, and the like, which are established for the industrial setting to indicate operation trends. For example, an alarm can include a specialization of condition event—wherein the initiation of such alarm can occur via an alarm event, and a message that carries the alarm to the receiver can signify an alarm message. Likewise, an activity can occur at a given point in time in the system, wherein an automation product generates and receives events.

The information associated with an event can be transmitted as a message between source and receiver of event information, for example. The correlation component 110 can supply a correlation between the data/events, to infer an outcome of the industrial process, for example. Moreover, relations among various parameters and data/events 111, 112, 113 can be discovered to determine and/or predict an outcome of an industrial process on-the-fly. Such correlation component 110 can further enable a tight control and short reaction time to process parameters, and for a modification thereof. Moreover, issues related to time lags associated with conventional factory controllers can be mitigated, as process parameter can be readily discovered and adapted.

The correlation component 110 can discover relations from data collected by embedded historians 121, 122, 123 (1 through m, m being an integer) that are distributed on the back plane of an industrial network. Data can be collected via such embedded historians in accordance with an organizational model of a hierarchical system that is distributed across various elements of an enterprise, for example. In contrast to conventional PC historians, embedded historians (e.g., micro historians) of the subject innovation are special purpose historians that reside in a backplane and supply direct interface (e.g., without a transition layer) to controllers and/or associated industrial units. Such embedded historians employ industrial specifications (e.g., regarding shock vibration, sealing, contamination proofing, and the like), and supply substantially higher data exchange speed as compared to conventional PC historians.

Figure 2:
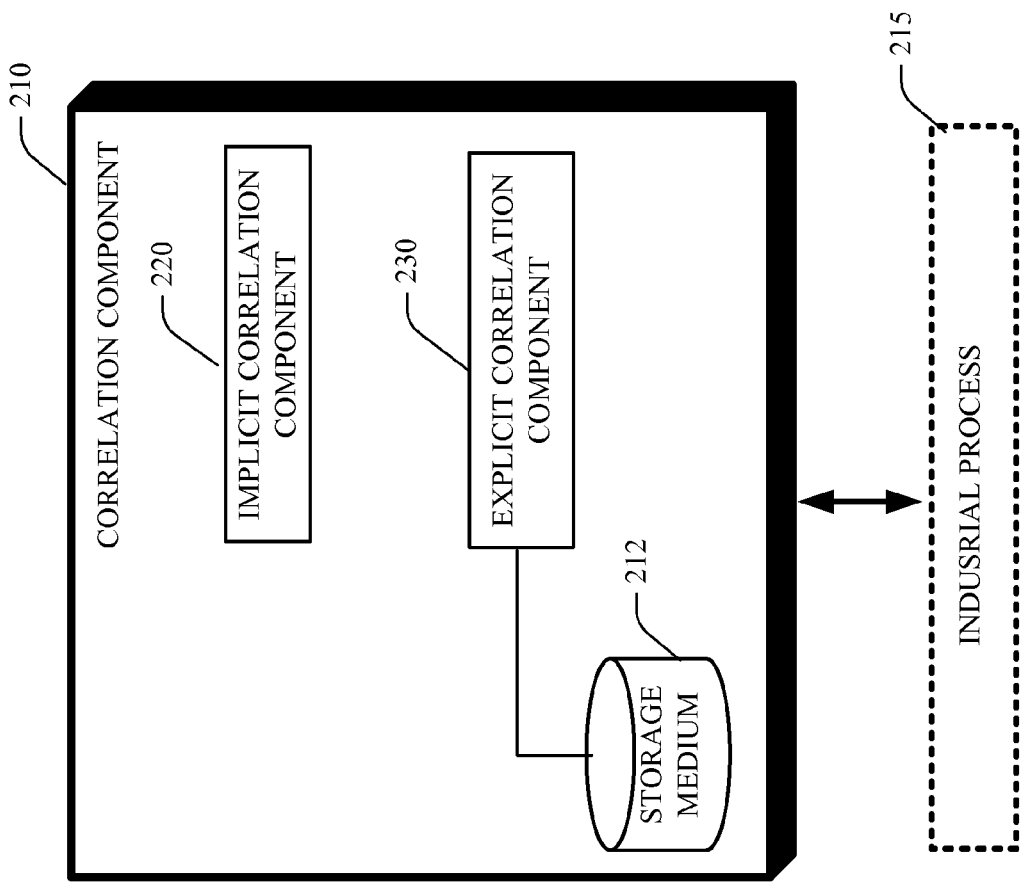
FIG. 2 illustrates a particular correlation component that discovers and identifies relationships among the events/data aspect for a correlation with the industrial processes in accordance with an aspect of the subject innovation.

FIG. 2 illustrates a particular correlation component that discovers and identifies relationships among the events/data aspect for a correlation with the industrial processes in accordance with an aspect of the subject innovation. The correlation component 210 can employ a heuristic model to capture process data/event data, and further include an implicit correlation component 220 and an explicit correlation component 230. The explicit correlation component 230 can employ predetermined models that are set by a user/external data sources and saved within a storage medium 212, and the implicit correlation component 220 can deduce relations among causes of triggering events. For example, instead of merely storing values, messages that caused transition of values can be stored and compared via the implicit correlation component 220 to derive correlations among various states that share the same messages. Accordingly, relations among various parameters can be discovered (e.g., dynamically) and proper corrective adjustments supplied to the industrial process 215.

Figure 3:
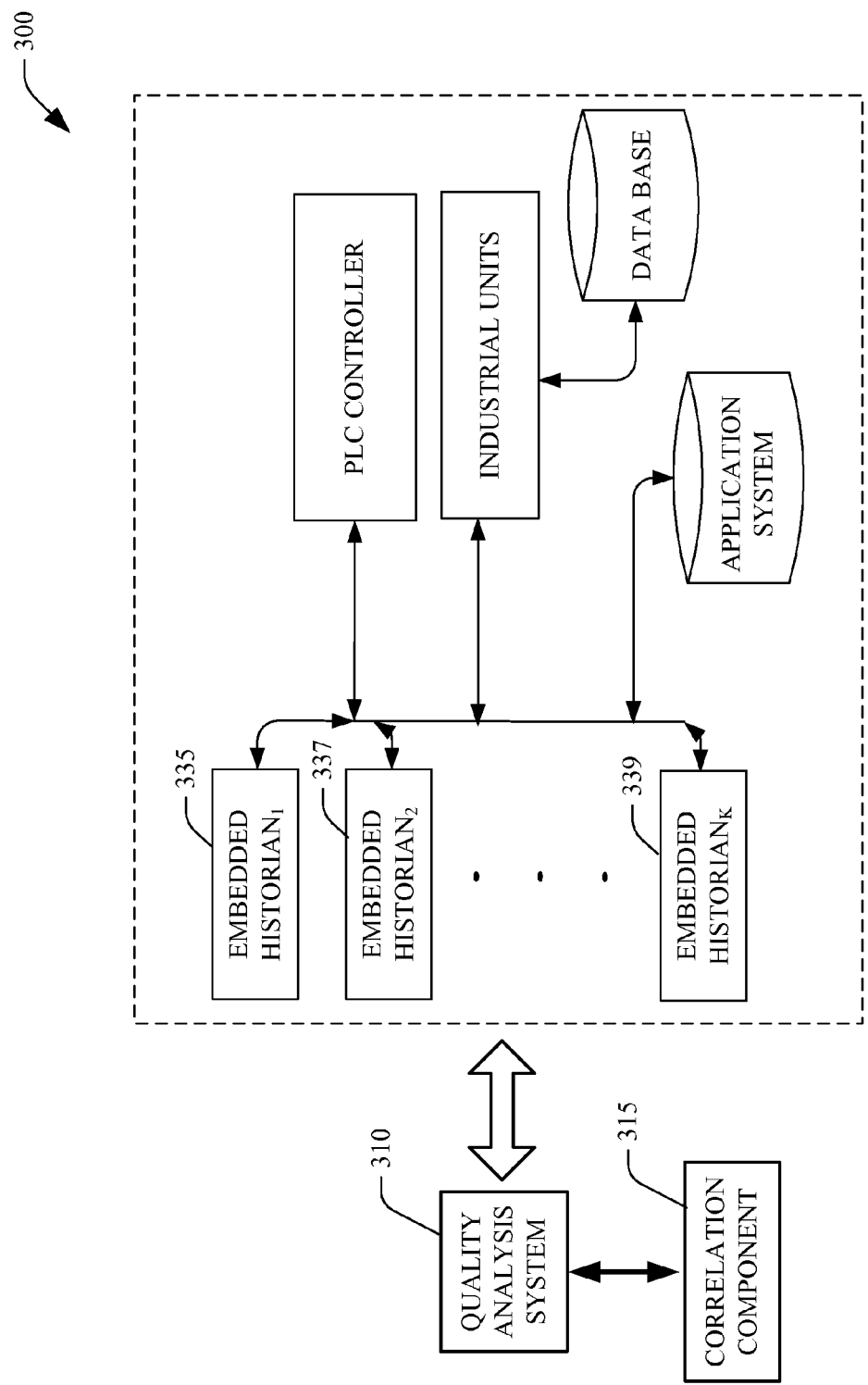
FIG. 3 illustrates a general block diagram of a correlation component that can dynamically infer relationships according to an aspect of the subject innovation.

FIG. 3 illustrates a general block diagram of a correlation component 315 that can dynamically infer relationships between disparate pieces of data and operation of the industrial unit 300. The correlation component 315 can interact with a quality analysis system that can perform quality analysis. Such quality analysis can occur ahead of processing and/or during the control process via employing historian data at various granularity levels, which can depend upon factors such as: the nature of the manufacturing process; outcome of the quality control tests; and the like. Moreover, based on such historian data that is collected via the embedded historians 335, 337, and 339 (1 to k, k being an integer), the quality control process of the subject innovation can predict outcome of quality for the industrial process and further initiate correction process in view of current value of data. For example, threshold values can be set to determine and trigger various actions during execution, such as: automatically performing corrective measures and maintenance procedures; invoking embedded files within a process that can be utilized by other components or reviewed by an operator; providing Just-In-Time training to an operator during various stages of the process; and/or spawning other automatic procedures during various stages of industrial production. By associating historians to quality procedures, timely, tighter and more stringent controls can be applied to various automation processes, thus increasing overall quality in an automated manufacturing environment. Data can be initially stored via historians 335, 337, and 339, and such storage can continue until predetermined threshold storage capacities associated with these historians are reached. Upon reaching such predetermined threshold, the stored data (e.g., history data) can be evaluated and the embedded historians 335, 337, and 339 notified to indicate that the data is no longer required and/or is not necessary for future access and hence can be overwritten.

Figure 4:
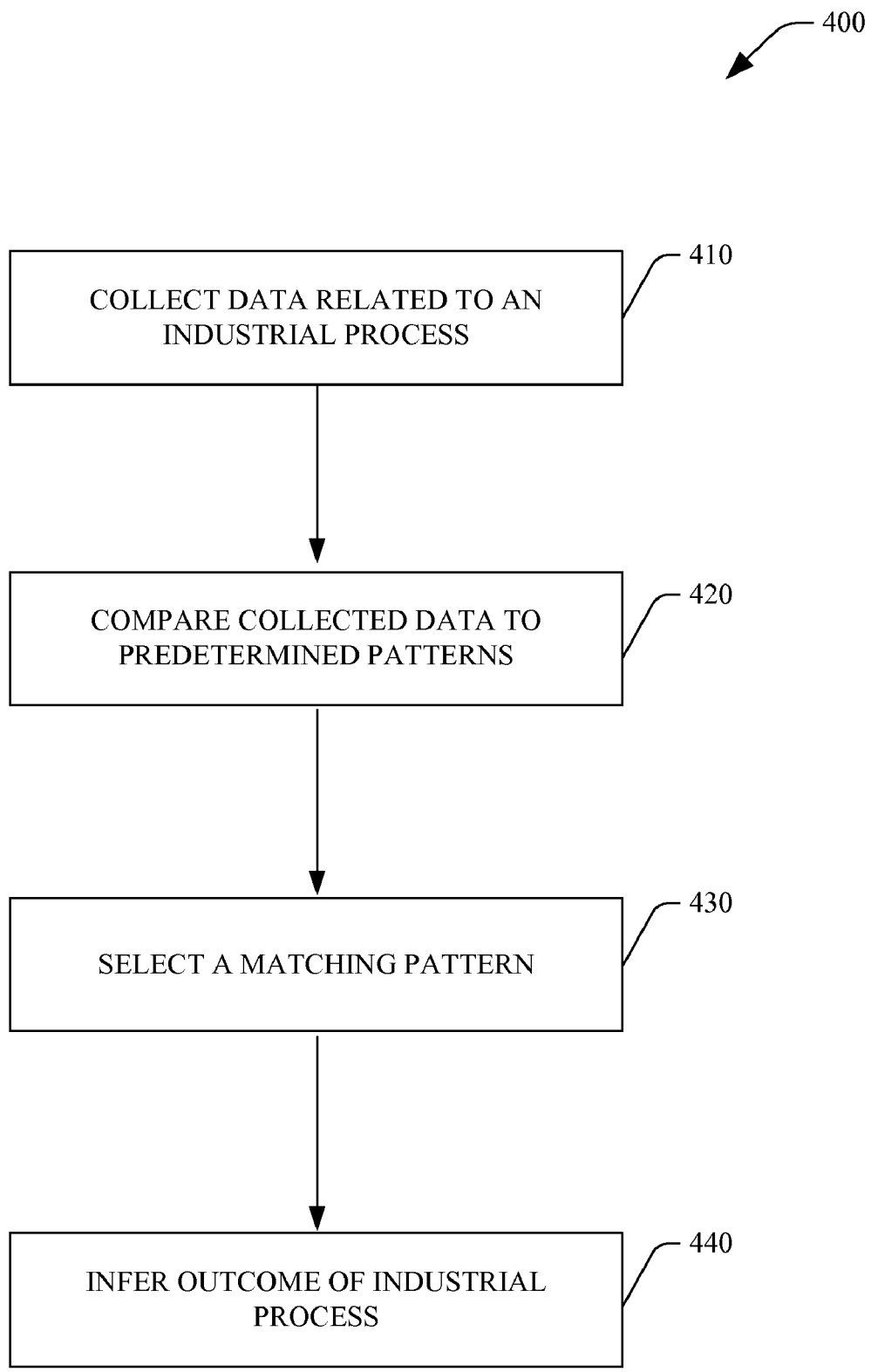
FIG. 4 illustrates a related methodology of inferring outcome of industrial process in accordance with an aspect of the subject innovation.

FIG. 4 illustrates a methodology 400 for prediction of outcomes based on matching of events with predetermined models in accordance with an aspect of the subject innovation. While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described. Initially and at 410 a set of data/events related to the industrial process can be collected. Next and at 420 such collected data can be compared to predetermined patterns, and a matching pattern subsequently selected (e.g., via a plurality of statistical models) at 430. An outcome of the industrial process can then be inferred at 440.

Figure 5:
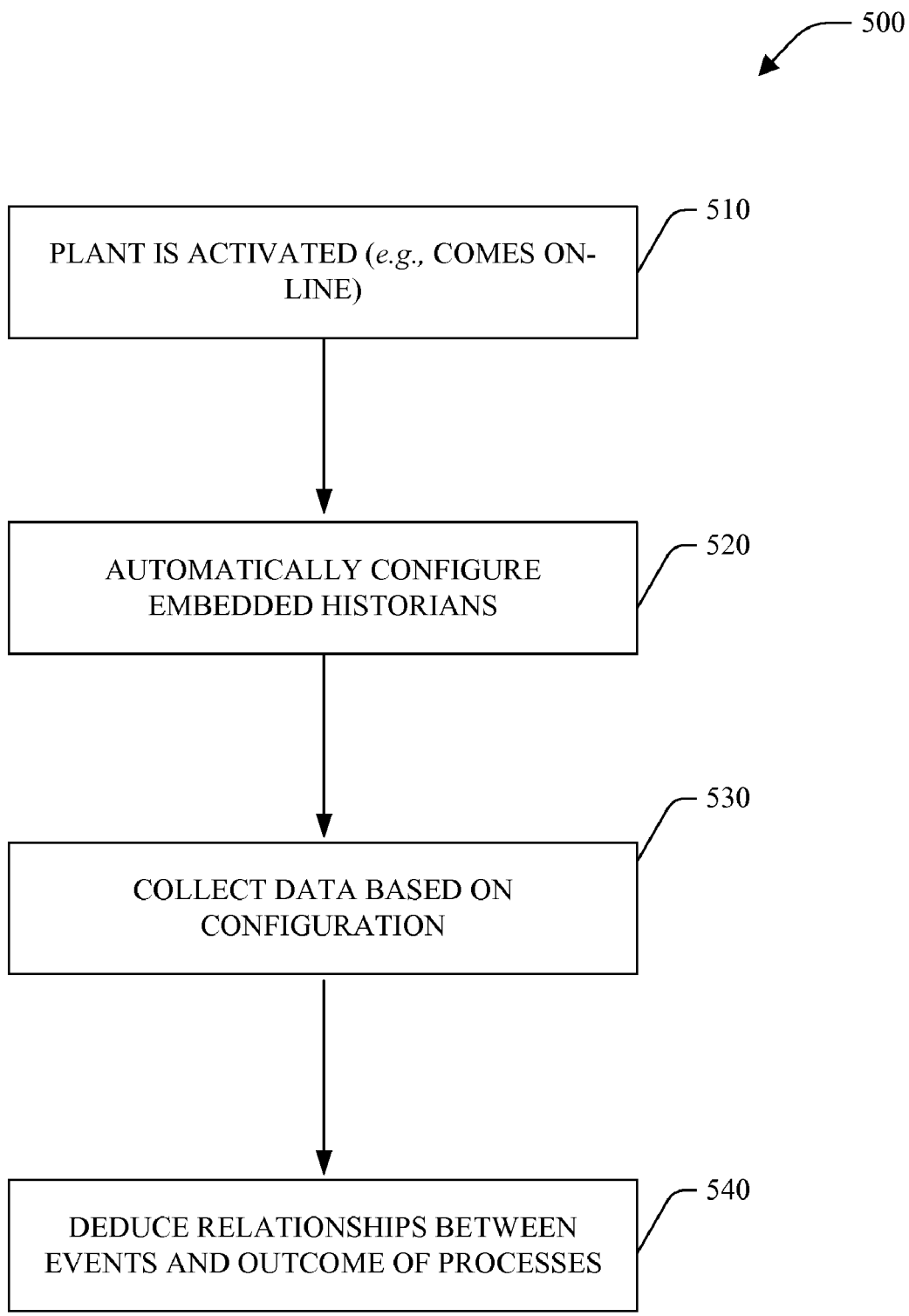
FIG. 5 illustrates a related methodology of relationship deduction in accordance with an aspect of the subject innovation.

FIG. 5 illustrates a related methodology 500 of supplying correlation among disparate events to deduce a trend in accordance with an aspect of the subject innovation. Initially and at 510, an industrial plant that employs a plurality of embedded historians is activated and comes on-line. At 520, such embedded historians can be configured according to a predetermined setting. For example, tags in an embedded historian can be automatically created, and be set up as a default collection for a plant scan, such that when a plant comes on-line, the embedded historians announce their presence to such plant, and are discovered thereby. Moreover, the configuration of the embedded historians can include, editing process variables, automation device names, creating tag references, data models, hierarchy, simulation of industrial processes, and the like. Based on such configuration, embedded historians can subsequently collect data related to the industrial process at 530. At 540 a determination is made regarding existence of trends among such collected data and discovery of content that is related to each other. Hence, algorithmically-deduced relationships between events and outcomes of an industrial process can be established, wherein in addition to adhering to predefined set of hierarchal categories, the subject innovation enables discovery of relations among individual/collective user(s). By leveraging the relationships that is deduced (e.g., statistical relationships that exist in unique ways, the subject innovation can discover content that is related to each other, such as between events and outcome of the process.

Figure 6:
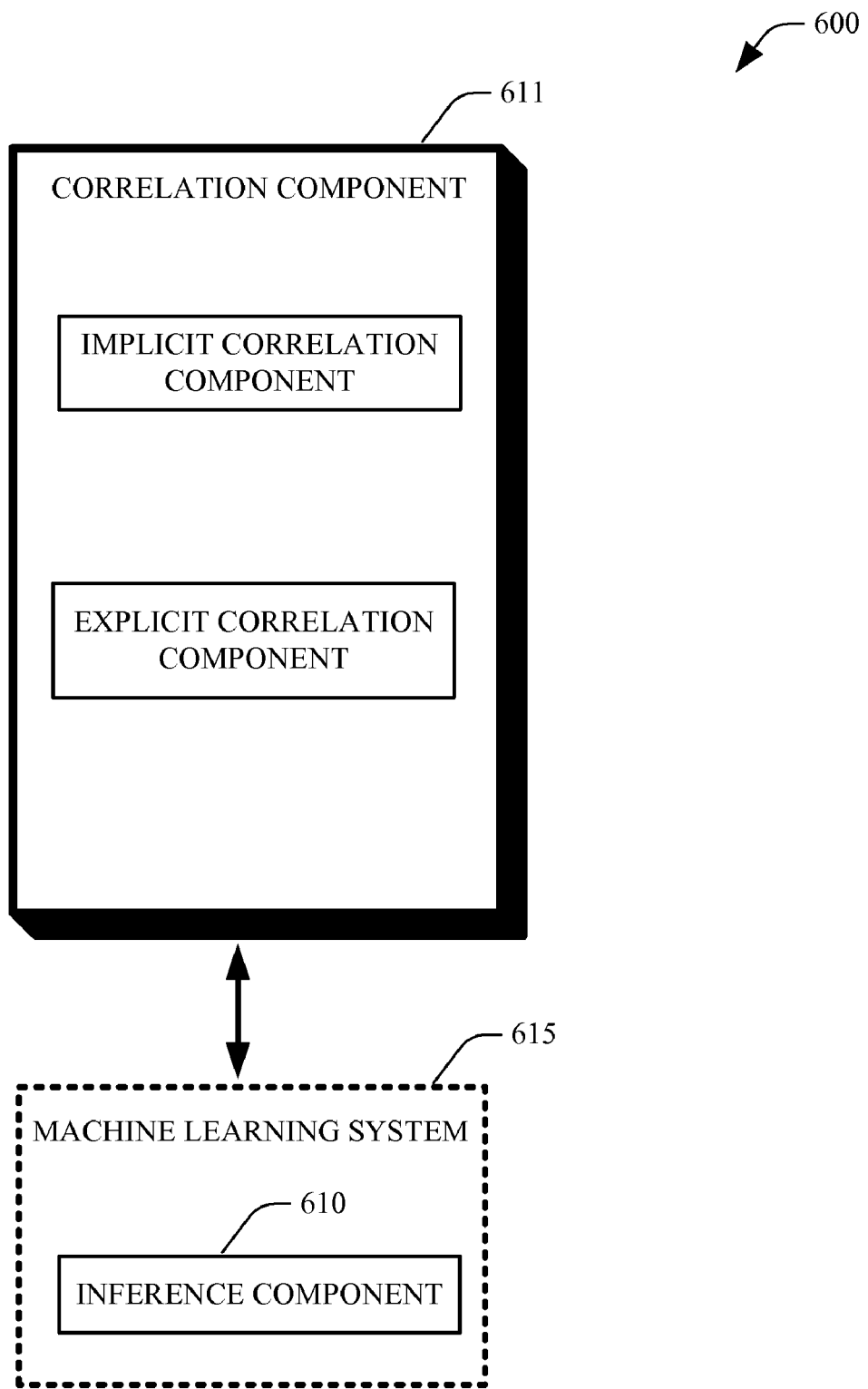
FIG. 6 illustrates a correlation component that interacts with a machine learning system that has an inference component, in accordance with an aspect of the subject innovation.

FIG. 6 illustrates a correlation component 611 that interacts with a machine learning system 600 that has an inference component 610, in accordance with an aspect of the subject innovation. The system 600 infers relationship between events/data collected and outcome of an industrial process. Thus, in addition to adhering to a predefined set of models for prediction of outcomes for processes (e.g., explicit correlation), the system 600 allows inferring dynamic models during operation of the industrial process and in real-time. As explained earlier, by leveraging the relationships that exist between operating parameters involved (e.g., temperature, crew members involved in the industrial line, time, and the like), the correlation component can discover content that is related to each other. Accordingly, the inference component 610 can employ one or more algorithms in order to infer possible relationships between the outcome and industrial parameters involved. For example, the inference component 610 can employ an algorithm that scores each potential process trend for auto suggesting by assigning a "point" for each time, an item that has been employed with such process trend results in a predicted outcome. Hence, trends with the highest number of points can be considered the "best" trends for auto suggestion of trends corresponding to the industrial parameters involved, for example.

Moreover, selecting the trends, and which ones are likely auto suggested can be accomplished by employing statistical analysis. For example, calculations on the number of standard deviations away from the statistical mean, where item(s) more than two standard deviations away, can be employed for auto suggesting a trend based on correlations involved.

In another example, the inference component 610 can employ a Bayesian classifier style of categorization. Accordingly, the inference component 610 typically computes the probability of a trend correlated to parameters of an industrial process actually occurs. The inference component 610 can employ the probabilities to suggest inferred relationships among the various correlations. In yet a further related example, the inference component 610 can score each potential trend for auto suggestion by assigning it a point for each time the tagging trend has actually occurred. For example, the trends with the highest number of points can be considered suitable for auto suggestion. It is to be appreciated that the inference component 610 can employ any appropriate inference algorithm for inferring relationship between the collected data and outcome of the industrial process.

In a related aspect, the inference component 610 can further employ an artificial intelligence (AI) component to facilitate correlating outcome of an industrial process with historian data and/or events. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

For example, a process for correlating trends between historian data/events can be facilitated via an automatic classifier system and process. A classifier is a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed.

Figure 7:
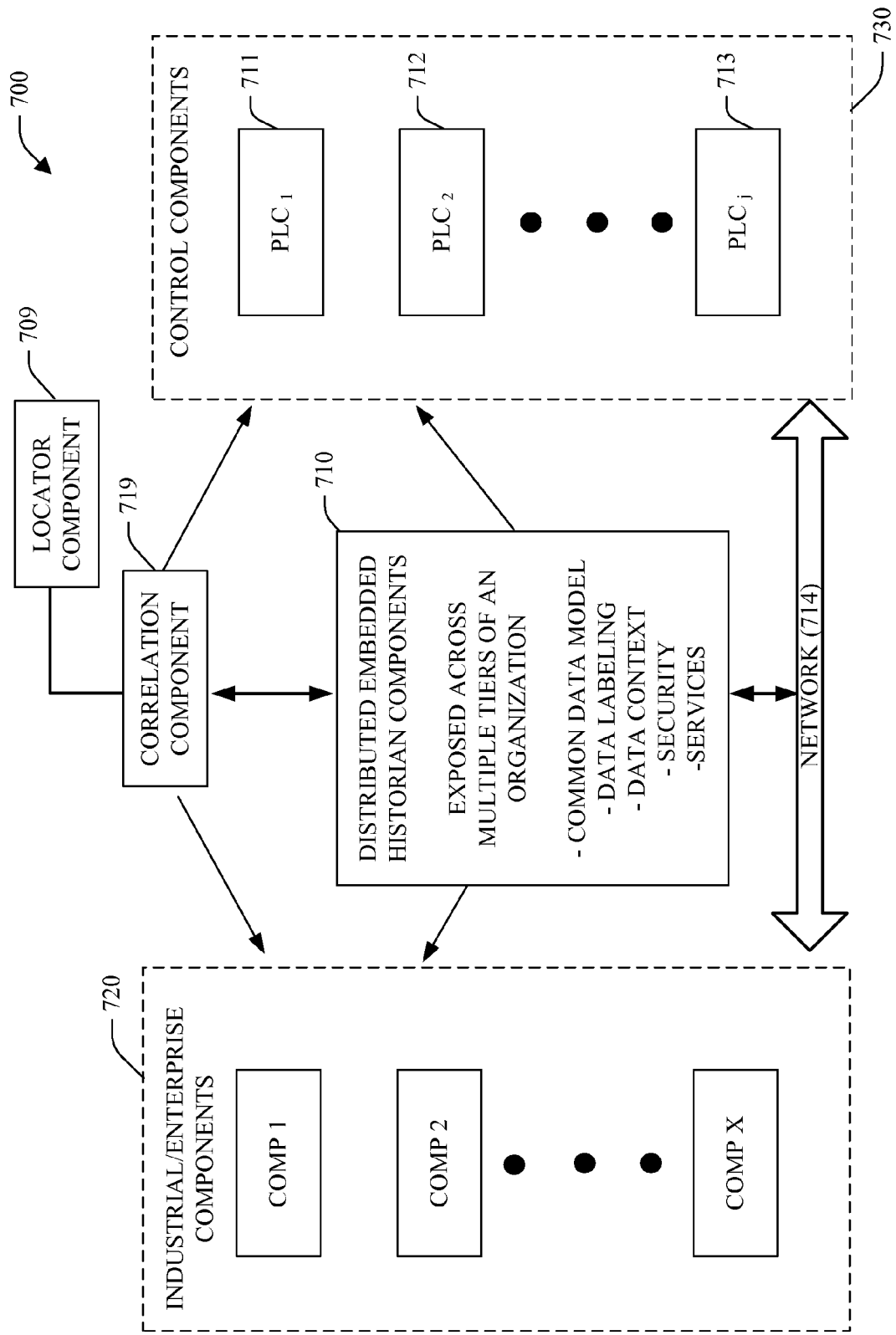
FIG. 7 illustrates a system that includes a plurality of embedded historian components operating in an organizational data model, wherein a correlation component infers various trends.

FIG. 7 illustrates a system 700 that includes a plurality of embedded historian components 710 operating in an organizational data model, wherein a correlation component 719 enables discovery of relations and correlates among disparate pieces of data, to infer possible relationships between the industrial process and historian data/events. Moreover, a locator component 709 can detect embedded historians (e.g., micro historians) that are distributed on the back plane of an associated industrial network. In addition, the embedded historian components 710 can be distributed across a network 714 to provide a collective or distributed database. The locator component 709 can be part of applications running on a control unit 730, which can function as a management control center for the industrial network system.

The industrial setting or organizational enterprise 700 can employ a plurality of computers or network components that communicate across the network 714, to one or more industrial control components 730, such as for example programmable logic controllers (PLCs) 711, 712, 713 (1 to j, j being an integer) or other factory components. Thus, the embedded historian components 710 can be operated as a singular or collective entity while being viewed, managed and distributed across substantially all or portions of the enterprise 720, control component 730 and/or locator component 709. For example, at the control levels 730, embedded historians can be embedded within a PLC rack to collect data, whereas higher levels at 720 can be employed to aggregate data from lower levels. Such can include higher level software components that communicate across the network 714 to collect data from lower level control components. The network 714 can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and the like. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Likewise, the industrial/enterprise 720 can include various computer or network components such as servers, clients, communications modules, mobile computers, wireless components, and the like which are capable of interacting across the network 714. Similarly, the term PLC as used herein can include functionality that can be shared across multiple components, systems, and/or networks 714. For example, one or more PLCs of the control component 730 can communicate and cooperate with various network devices across the network 714. Such can include substantially any type of control, communications module, computer, I/O device, sensor, Human Machine Interface (HMI)) that communicate via the network 714 which includes control, automation, and/or public networks. The PLC 730 can also communicate to and control various other devices such as Input/Output modules including Analog, Digital, Programmed/Intelligent I/O modules, other programmable controllers, communications modules, and the like.

The system 700 enables combining organizational information such as an organizational or hierarchical data model which represents a common model of a plant that can be based in the S88 or S95 model, and is distributed among computers of the enterprise 720 and industrial controllers 730, for example. The model can be viewed as an Organizational Data Model—a tree-like hierarchical and heterogeneous structure of organizational Units. For instance, respective Organizational Units can include other Organizational Units. Organizational Units can be either physical locations (e.g., Site, Area) or logical grouping node or collection (e.g., Enterprise as a collection of Sites). The nodes in the organizational hierarchy or model can have associated items representing the plant's production and control equipment, tags, backing tags (e.g., Alarm & Event and the like), programs, equipment phases, I/O devices, and other application related entities. These organizational units thus can form an application view of the user's system.

A typical system 700 can assign the upper levels of the hierarchy such as an Enterprise node and site to a computer system and the lower levels such as area, line, cell and machine can be contained in multiple industrial controllers 730; each of which can include components that are members of one or more organization units such as area or area model. Moreover, an organization unit can contain components from one or more controllers. The embedded historian component 710 can be positioned at various levels of the enterprise 720 and/or control 730; and can also further be integrated therein and scaled according to system data collection requirements. Such organizational model enables embedded historian components 710 to locate data of interest for collection purposes and to readily adapt and become integrated within the larger system 700.

Adaptability within the system 700 can be facilitated by data having additional information such as metadata that identifies the purpose of the data. Such metadata can further be employed by the locator component 709 to identify a micro-historian. For example, the locator component 709 can employ a trail of metadata to identify the embedded historians and relevant historian data for collection Accordingly, one form of data can identify itself as a control tag that has been marked or labeled via metadata to indicate its significance for data collection purposes. Another type of label or metadata can indicate security information that is being distributed throughout the system 700. Furthermore, other type of data can indicate that an alarm condition or an event has occurred within the system and thus, a respective embedded historian component should capture such alarm or event. In general, the organizational model enables embedded historian components 710 to receive functionality or data context from the system 700 and to expose its respective functionality to the system via the model. For example, context allows embedded historian components to such auto configuration routines where one or more components of the embedded historian architecture can be automatically discovered and configured onto a respective system. Hence, the embedded historian components 710 and the locator component 709 can be automatically integrated within the system 700, to further facilitate scaling of the system as data conditions change.

In a related aspect, such scaling can include the ability of one or more components of an organization to collaborate, and provide an overall scheme for historical data collection. Such can include having lower level PLCs or factory components collecting data and sharing this data with higher levels of the organization. If one or more of the levels become overloaded with the data collection process, historian functionality can be shifted between levels (upwards or downwards) to more effectively employ system-wide resources in an efficient manner. For instance, communications between levels can allow sharing of data collection responsibilities between one or more levels of the enterprise from the very lowest levels through the higher levels of the organizational hierarchy.

For example, the lowest level entity can have sufficient memory for data collection of desired embedded historian or archived information. If such memory resources are consumed, messaging capabilities throughout the hierarchy can subsequently take over to distribute storage responsibilities from one layer to another via suitable network messages (wireless or wired) that communicate data from one level to another. It is to be appreciated that tiers of an organization can collaborate in many combinations. Thus, a high level tier could collaborate with a low level tier or collaboration can take place between multiple tiers if desired such as between higher levels, intermediate levels, and lower levels of an organization.

The locator component 709 can identify embedded historians (e.g., micro-historians), and notify them to collect various data types. The locator component 709 can subsequently locate embedded historians that have collected or have access to a collection of such data types. Next, the data can be acquired, supplied and reported to the user via a plurality of interfaces. Such interfaces can be supplied to manipulate the embedded historian components 710 and organizational data model; such as a Graphical User Interface (GUI) to interact with the model or other components of the hierarchy; e.g., as any type of application that sends, retrieves, processes, and/or manipulates factory or enterprise data, receives, displays, formats, and/or communicates data, and/or facilitates operation of the enterprise 720 and/or PLCs 730. For example, such interfaces can also be associated with an engine, server, client, editor tool or web browser although other type applications can be utilized.

Figure 8:
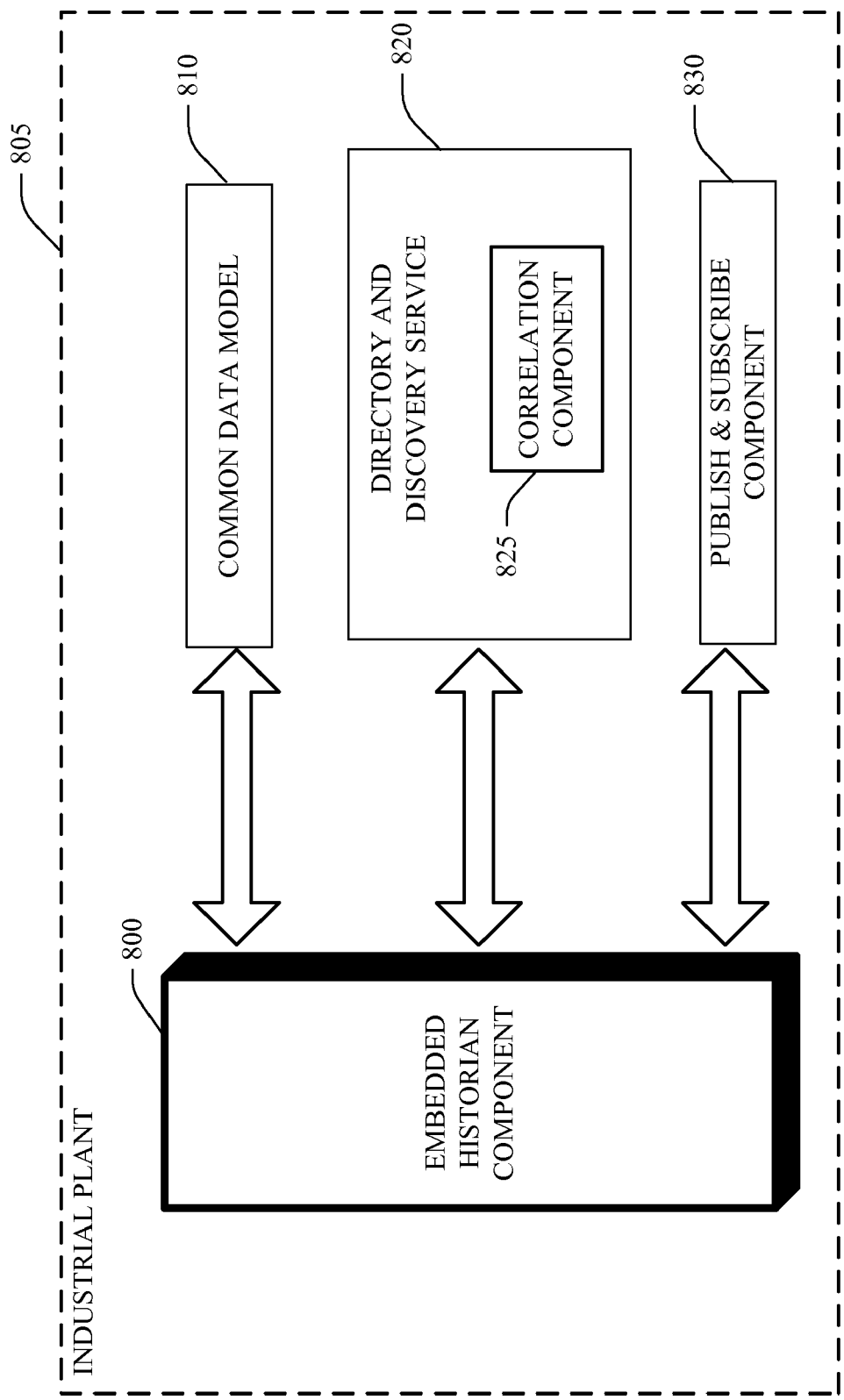
FIG. 8 illustrates a correlation component that is operatively connected to embedded historians in accordance with an aspect of the subject innovation.

FIG. 8 illustrates a correlation component 825 that is operatively connected to embedded historian network/embedded historians 800 in accordance with an aspect of the subject innovation. The industrial setting 805 can employ a hierarchical data model with various level; e.g., enterprise level, site level (factory represented within a data packet), area level (an area within the factory associated with the data); line level (a line associated with particular data), a work-cell level (that indicates a work-cell associated with the data) and the like. For example by employing a nested, hierarchical data model, embedded historian components 800 can readily become aware of data associated therewith. Furthermore, such hierarchy can further be customized by users to obtain increased granularity within the hierarchy. The common plant model can enable the embedded historian component 800 to determine data contexts in an automated manner. The common data model 810 allows data to be marked or labeled via metadata for example to both expose embedded historian functionality to a system and/or to allow the embedded historian component 800 to be automatically integrated within the system according to data that is exposed to the embedded historian component. For example, one such labeling can pertain to security, and typically can affect substantially all components in the system associated with the common model 810.

The correlation component 825 can be associated with a directory and discovery service. Such an arrangement enables the embedded historian component 800 to locate other embedded historian components in the system and to receive/expose historian data to other system components. This can include a network directory that determines physical addresses from logical names and vice versa, for example. Moreover, the publish and subscribe component 830 can provide subscription functionality to the embedded historian component 800, wherein data collection efficiency of the system can be enhanced. For example, the publish and subscribe component 830 of the system 805 allows data to be published or generated when a change in the data has been detected. Thus, the embedded historian component 800 can subscribe to such change events and thus only record data when a change has occurred which reduces the amount of data to be stored. Additionally, a polling/publication arrangement can also be employed wherein the embedded historians (e.g., micro-historians) identify themselves to the correlation component 825 upon occurrence of a predetermined event, and/or periodically.

Figure 9:
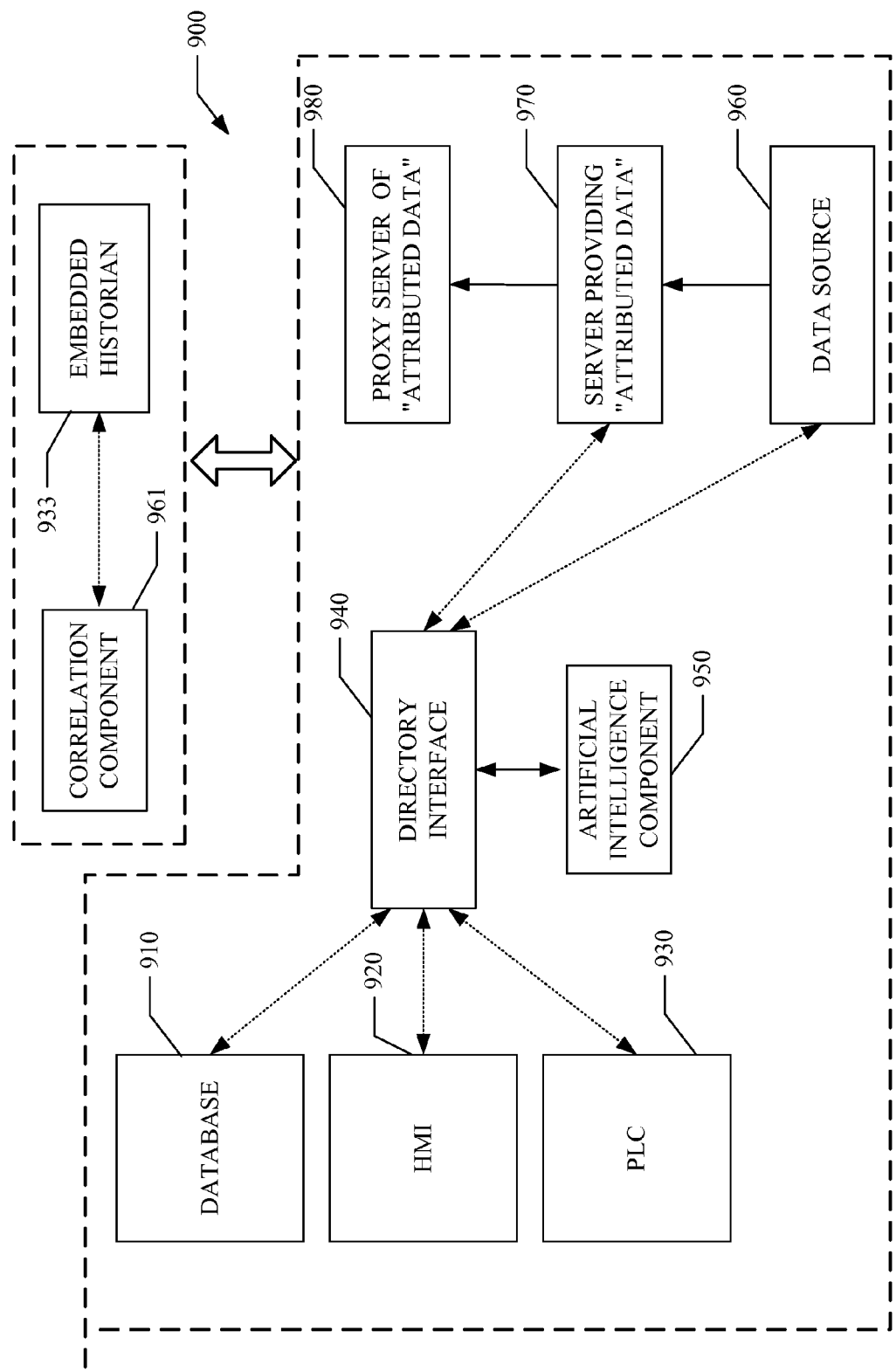
FIG. 9 illustrates an exemplary industrial automation network that can implement a correlation component in accordance with an aspect of the subject innovation.

FIG. 9 illustrates an exemplary industrial automation network that employs an embedded historian component 933, to enable high speed data collection (e.g., real time) from the industrial setting 900, for correlation with outcome of an industrial process. As such, the correlation component 961 can correlate among disparate pieces of data to infer possible relationships between the industrial process and historian data/events to improve industrial operations. The system 900 can further include a database 910, a human machine interface (HMI) 920 and a programmable logic controller (PLC) 930, and a directory interface 940. The directory interface 940 can further associate with an Artificial Intelligence (AI) component 950 to facilitate efficient identification of desired data within a particular network/application, and for correlation of the events/data with the industrial outcome.

The directory interface 940 can be employed to provide data from an appropriate location such as the data source 960, a server 970 and/or a proxy server 980. Accordingly, the directory interface 940 can point to a source of data based upon role and requirements (needs) of a requester (e.g., database 910, HMI 920, PLC 930, and the like.) The database 910 can be any number of various types such as a relational, network, flat-file or hierarchical systems. Typically, such databases can be employed in connection with various enterprise resource planning (ERP) applications that can service any number of various business related processes within a company. For example, ERP applications can be related to human resources, budgeting, forecasting, purchasing and the like. In this regard, particular ERP applications may require data that has certain desired attributes associated therewith. Thus, in accordance with an aspect of the subject invention, the directory interface 940 can provide data to the database 910 from the server 970, which provides data with the attributes desired by the database 910.

As illustrated in FIG. 9, the embedded historian 933 can leverage directory interface 940 and other software services/re-locatable information services to locate other embedded historian components and their configurations. In addition, the correlation component 961 can further detect embedded historians 933 that are distributed on the back plane of an industrial network.

Accordingly, the correlation component 961 can employ models to correlate various data (e.g., events, command, event, alarm, scenarios, transactions, messages, and the like), with outcome of the industrial process.

Moreover, the HMI 920 can employ the directory interface 940 to point to data located within the system 900. The HMI 920 can be employed to graphically display various aspects of a process, system, factory, etc. to provide a simplistic and/or user-friendly view of the system. Accordingly, various data points within a system can be displayed as graphical (e.g., bitmaps, jpegs, vector based graphics, clip art and the like) representations with desired color schemes, animation, and layout.

The HMI 920 can request data to have particular visualization attributes associated with data in order to easily display such data thereto. For example, the HMI 920 can query the directory interface 940 for a particular data point that has associated visualization attributes. The directory interface 940 can determine the proxy server 980 contains the attributed data point with the desired visualization attributes. For instance, the attributed data point can have a particular graphic that is either referenced or sent along with the data such that this graphic appears within the HMI environment instead of or along with the data value.

As explained earlier, the PLC 930 can be any number of models such as Allen Bradley PLC5, SLC-500, MicoLogix, and the like. The PLC 930 is generally defined as a specialized device employed to provide high-speed, low-level control of a process and/or system. The PLC 930 can be programmed using ladder logic or some form of structured language. Typically, the PLC 930 can utilize data directly from a data source (e.g., data source 960) that can be a sensor, encoder, measurement sensor, switch, valve and the like. The data source 960 can provide data to a register in a PLC and such data can be stored in the PLC if desired. Additionally, data can be updated (e.g., based on a clock cycle) and/or output to other devices for further processing.

Figure 10:
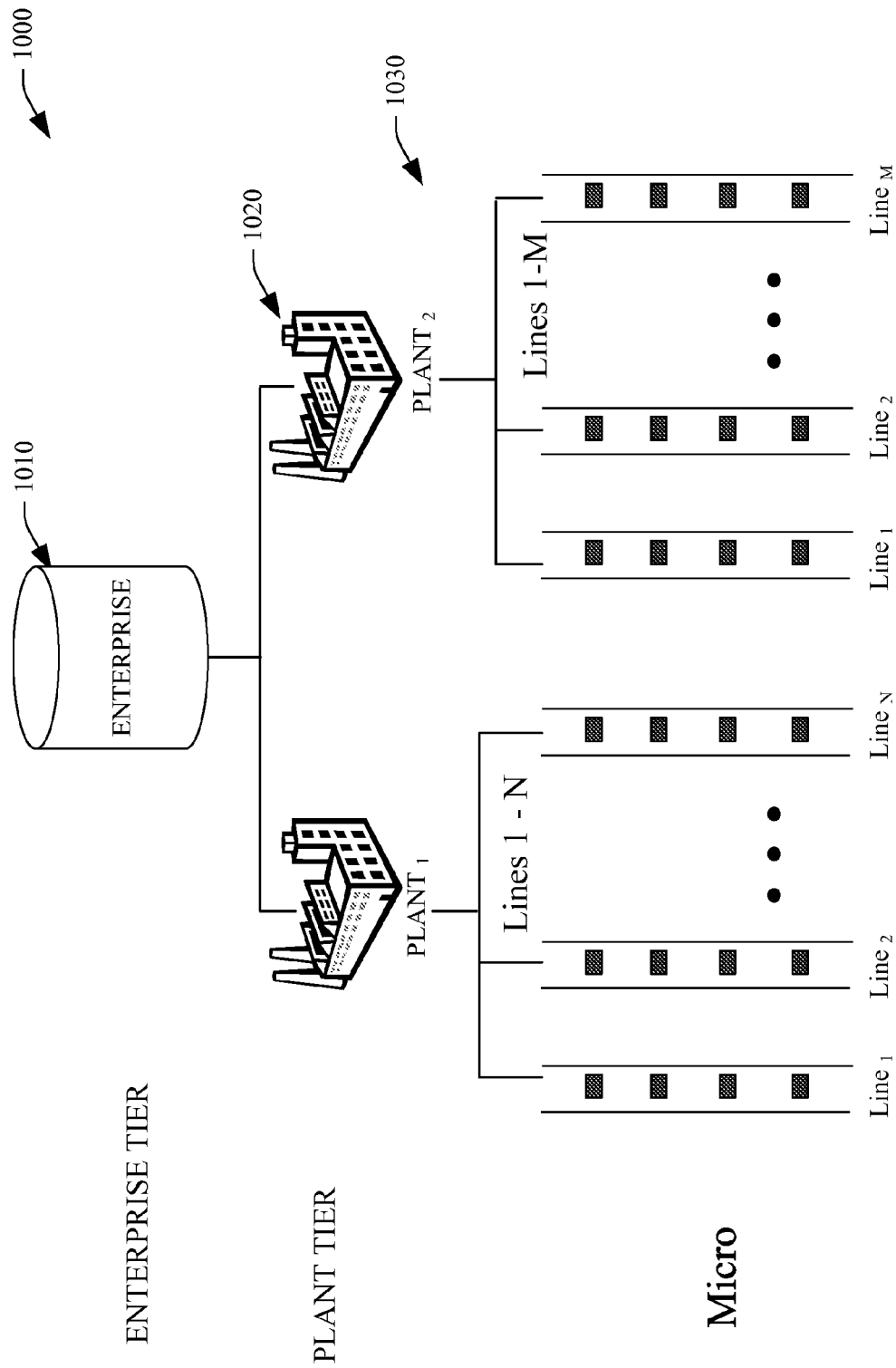
FIG. 10 illustrates an exemplary multi-tiered and distributed historian system, in accordance with an aspect of the subject innovation.

FIG. 10 illustrates an exemplary multi-tiered and distributed historian system 1000, which can employ a correlation component in accordance with an aspect of the subject innovation. The exemplary system 1000 illustrates three tiered historian level, wherein the highest data collection tier is illustrated and can be referred to as the enterprise tier 1010. This tier aggregates data collected from lower level tiers such as from a plant tier 1020 and a micro or embedded tier 1030. As illustrated, the tiers 1010 and 1020 can include archival or permanent storage capabilities. In the system 1000, data can be collected from two plants at the tier 1020, and from a plurality of historian components at tier 1030. It is to be appreciated that such an arrangement is exemplary in nature, and other arrangements are well within the realm of the subject innovation.

Typically, the system 1000 can be viewed as a Distributed Historian that spans machines, plants, and enterprises. At level 1030, the historian collects data at the rack level and is coupled to Common Plant Data Structure described above. Such can include collecting process & discrete data, alarms & events in a single archive if desired. Other aspects can include auto-discovery of data and context from controllers in local chassis including store/forward data capabilities from local buffers. Data can be collected without polling, having a low communications bandwidth. The plant level 1020 aggregates data from Micro or rack-embedded Historians and/or other data sources (e.g., Live Data source). Such can include plant-level querying, analytics, reporting while efficiently storing, retrieving, and managing large amounts of data. This level can also auto-discover data and data model context from Micro Historians located at level 1030. Other features of the system 1000 can include analysis components, logical units, components for interaction with report elements, embeddable presentation components, replication of configuration, storage, archiving, data compression, summarization/filtering, security, and scalability.

Figure 11:
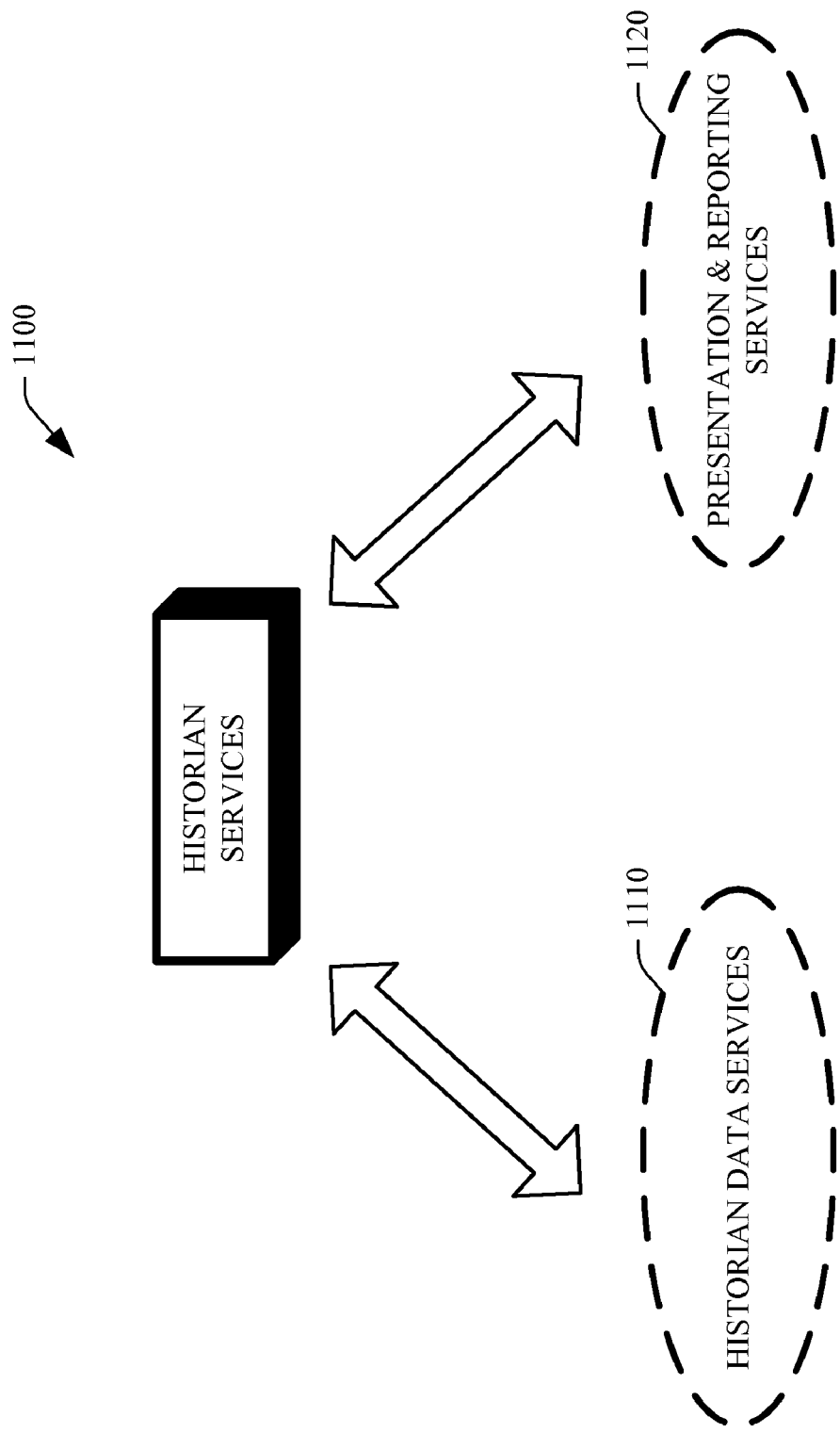
FIG. 11 illustrates historian services that include historian data services and presentation and reporting services.

FIG. 11 illustrates historian services 1100 that include historian data services 1110 and presentation and reporting services 1120. Historian Data Services 1110 (HDS) can supply generic, customizable services for collecting and storing data with plant model-defined context. This can include configuration of data to be collected e.g., tags, data context, alarms, events, diagnostics, SOE data and configuration of data to be forwarded to a higher level. Collection of data can be from disparate sources including storage of data, retrieval of data, and management of data. Management of data collected by/residing in other data stores (e.g., higher-level business systems, 3rd party products) can be processed by the respective applications. The presentation and reporting services 1120 (PRS) can supply generic, customizable services for collating and presenting data in a common plant model-defined context. This can include access to stored data, analysis/calculators and query mechanisms, and embeddable, interactive presentation components (e.g., text, charts, SPC). The service 1110 can generate reports with various means of presentation/distribution (e.g., web, email) having export capabilities to standard formats (e.g., XML, Excel).

Figure 12:
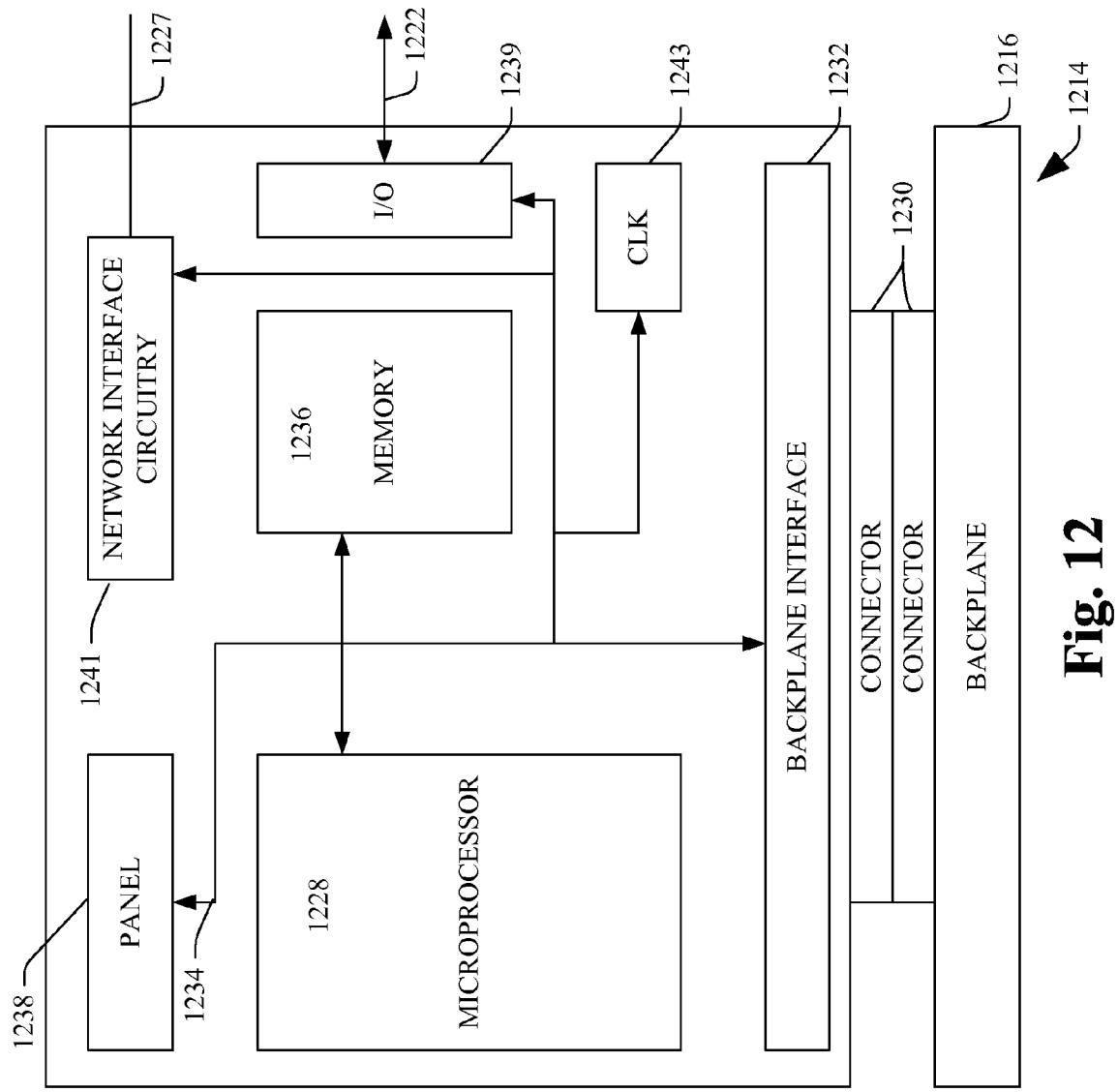
FIG. 12 illustrates an exemplary environment that can employ a correlation component for inference of trends in accordance with an aspect of the subject innovation.

FIG. 12 illustrates an exemplary environment that can employ correlation component that can identify trends in accordance with an aspect of the subject innovation. As illustrated, each functional module 1214, is attached to the backplane 1216 by means of a separable electrical connector 1230 that permits the removal of the module 1214 from the backplane 1216 so that it may be replaced or repaired without disturbing the other modules 1214. The backplane 1216 provides the module 1214 with both power and a communication channel to the other modules 1214. Local communication with the other modules 1214 through the backplane 1216 is accomplished by means of a backplane interface 1232 which electrically connects the backplane 1216 through connector 1230. The backplane interface 1232 monitors messages on the backplane 1216 to identify those messages intended for the particular module 1214, based on a message address being part of the message and indicating the message destination. Messages received by the backplane interface 1232 are conveyed to an internal bus 1234 in the module 1214.

The internal bus 1234 joins the backplane interface 1232 with a memory 1236, a microprocessor 1228, front panel circuitry 1238, I/O interface circuitry 1239 and communication network interface circuitry 1241. The microprocessor 1228 can be a general purpose microprocessor providing for the sequential execution of instructions included within the memory 1236 and the reading and writing of data to and from the memory 1236 and the other devices associated with the internal bus 1234. The microprocessor 1228 includes an internal clock circuit (not shown) providing the timing of the microprocessor 1228 but may also communicate with an external clock 1243 of improved precision. This clock 1243 may be a crystal controlled oscillator or other time standard including a radio link to an external time standard. The precision of the clock 1243 may be recorded in the memory 1236 as a quality factor. The panel circuitry 1238 includes status indication lights such as are well known in the art and manually operable switches such as for locking the module 1214 in the off state.

The memory 1236 can comprise control programs or routines executed by the microprocessor 1228 to provide control functions, as well as variables and data necessary for the execution of those programs or routines. For I/O modules, the memory 1236 may also include an I/O table holding the current state of inputs and outputs received from and transmitted to the industrial controller 1210 via the I/O modules 1220. The module 1214 can be adapted to perform the various methodologies of the innovation, via hardware configuration techniques and/or by software programming techniques.

It is noted that as used in this application, terms such as "component," "hierarchy," "model," and the like are intended to refer to electromechanical components, and/or a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

What has been described above includes various exemplary aspects. It is, of course, not possible to describe every conceivable combination of components or methodologies for purposes of describing these aspects, but one of ordinary skill in the art may recognize that many further combinations and permutations are possible. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the innovation. In this regard, it will also be recognized that the innovation includes a system as well as a computer-readable medium having computer-executable instructions for performing the acts and/or events of the various methods of the innovation. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation system, comprising:
   one or more processors;
   a memory communicatively coupled to the one or more processors, the memory having stored therein computer-executable instructions configured to implement the system, including:
   a plurality of embedded historians configured to collect data associated with an industrial process within an organization;
   a hierarchical data model representing the organization and distributed across at least two system components within the organization, wherein the hierarchical data model exposes functionality of at least a first of the plurality of embedded historians to at least one of a second of the plurality of embedded historians or one or more of the at least two system components; and
   a correlation component that infers relationships between events and operation of the industrial process based on the data, the correlation component comprising at least an implicit correlation component configured to infer relationships between causes of triggering events substantially in real-time.

2. The industrial automation system of claim 1, the correlation component further comprising an explicit correlation component that employs predetermined models to infer the relationships.

3. The industrial automation system of claim 1, the correlation component further comprising heuristic models.

4. The industrial automation system of claim 1, wherein the hierarchical data model comprises nodes that represent units associated with the organization.

5. The industrial automation system of claim 1, further comprising an artificial intelligence component configured to facilitate trend verification between the data and an outcome of the industrial process.

6. The industrial automation system of claim 1, further comprising a Human Machine Interface (HMI) configured to graphically display a view of the industrial automation system.

7. The industrial system of claim 1, wherein the plurality of embedded historians are configured to employ the organizational hierarchy data model to locate data to be collected.

8. The industrial system of claim 1, wherein the embedded historians are associated with at least one of a controller, a module in a chassis, a server, a sensor, or a factory component.

9. The industrial system of claim 1, wherein the hierarchical data model is configured to employ metadata associated with the data to determine a purpose of the data.

10. The industrial system of claim 1, further comprising a publish and subscribe component configured to instructs the plurality of embedded historians to record the data upon detection of a change to the data.

11. The industrial automation system of claim 1, wherein at least one of the plurality of embedded historians is configured to store at least one message that causes transition of a data value, and the implicit correlation component analyzes the at least one message to infer at least one of the relationships.

12. A method of inferring relationships in an industrial automation system comprising:

distributing a hierarchical data model of an industrial plant among at least two system components residing on one or more hierarchical levels of the industrial plant;

identifying a data type for collection by a plurality of embedded historians distributed among the at least two system components and associated with the hierarchical data model, the hierarchical data model exposing functionality of at least a first of the plurality of embedded historians to at least one of a second of the plurality of embedded historians or one or more of the at least two system components;

locating a subset of the plurality of embedded historians that have access to data of the data type;

acquiring data of the data type using the subset of the plurality of embedded historians; and inferring a trend for operation of the industrial automation system based on the data.

13. The method of claim 12, further comprising employing heuristics models to infer the trend.

14. The method of claim 12, further comprising employing metadata to determine a relevance or function of data collected by the plurality of embedded historians.

15. The method of claim 12, further comprising employing a directory to locate a source of at least a subset of the data.

16. The method of claim 12, wherein the collecting the data comprises collecting the data across various levels of the industrial plant.

17. The method of claim 12, further comprising initiating at least one corrective action on the industrial process based at least in part on the trend.

18. An industrial controller system comprising:

collection means for collecting data related to at least one industrial process at multiple levels of an organization;

means for representing the organization as a hierarchical data model distributed among at least two devices comprising the organization, the hierarchical data model exposing functionality of the collection means to the at least two devices;

means for locating the collection means using the hierarchical data model; and means for inferring trends of operation associated with the industrial controller system based on the data, wherein the means for inferring comprise means for inferring relationships between causes of triggering events substantially in real-time.

* * * * *